(12) United States Patent
Hooke

(10) Patent No.: US 6,534,212 B1
(45) Date of Patent: Mar. 18, 2003

(54) HIGH PERFORMANCE BATTERY AND CURRENT COLLECTOR THEREFOR

(75) Inventor: John W. Hooke, Warrensburg, MO (US)

(73) Assignee: Hawker Energy Products, Inc., Warrenburg, MO (US)

( * ) Notice: Subject to any disclaimer, the term of this patent is extended or adjusted under 35 U.S.C. 154(b) by 0 days.

(21) Appl. No.: 09/566,190

(22) Filed: May 5, 2000

(51) Int. Cl.[7] .............................. H01M 4/00; H01M 2/10
(52) U.S. Cl. ......................... 429/94; 429/186; 429/211
(58) Field of Search ........................... 429/94, 211, 161, 429/129, 186, 233, 241, 178, 142, 143

(56) References Cited

U.S. PATENT DOCUMENTS

| | | | |
|---|---|---|---|
| 4,237,593 A | 12/1980 | Wolf | 29/157.1 |
| 4,529,675 A * | 7/1985 | Sugalski | 429/94 |
| 5,045,086 A | 9/1991 | Juergens | |
| 5,047,300 A | 9/1991 | Juergens | 429/94 |
| 5,198,313 A | 3/1993 | Juergens | 429/94 |
| 5,368,961 A | 11/1994 | Juergens | 429/233 |
| 5,677,078 A | 10/1997 | Juergens et al. | 429/94 |
| 5,820,639 A | 10/1998 | Snyder et al. | 29/623.5 |
| 5,895,728 A | 4/1999 | Walker et al. | 429/53 |
| 2001/0001692 A1 * | 5/2001 | Gillman et al. | 429/245 |

FOREIGN PATENT DOCUMENTS

| | | | |
|---|---|---|---|
| EP | 0 921 581 A1 | 6/1999 | |
| EP | 0 994 519 A2 | 4/2000 | |
| GB | 2 086 646 A | 5/1982 | ............ H01M/2/12 |
| JP | 2000-100412 | 9/2000 | |

OTHER PUBLICATIONS

International Search Report for PCT/US01/14599; date of mailing Mar. 21, 2002.

\* cited by examiner

Primary Examiner—Stephen Kalafut
Assistant Examiner—R Alejandro
(74) Attorney, Agent, or Firm—Myers Bigel Sibley & Sajovec

(57) ABSTRACT

A winding assembly for a battery includes a positive electrode plate, a negative electrode plate, a separator sheet, and a current collector. The positive and negative plates and the separator sheet are wound in overlying relationship such that the separator sheet is positioned between the positive and negative plates, an exposed top edge of the positive electrode plate is spaced longitudinally from an adjacent unexposed top edge of the negative plate, and an exposed bottom edge of the negative electrode plate is spaced longitudinally from an unexposed bottom edge of said positive electrode plate. The current collector is connected to one of the exposed edges of one of the positive and negative electrode plates, and, accordingly, is spaced apart from the adjacent unexposed bottom edge of the other (i.e., the non-attached) electrode plate. The current collector includes a terminal mounting portion and a radially extending collecting web. The collecting web of the current collector includes a perimeter, at least one open-ended perimeter aperture located at the perimeter and extending radially inwardly therefrom, and at least one closed-end internal aperture positioned between the terminal portion and the perimeter. Also, the current collector may have recessed areas surrounding the apertures to facilitate joining of the current collector and the electrode plate.

36 Claims, 6 Drawing Sheets

HIGH PERFORMANCE BATTERY AND CURRENT COLLECTOR THEREFOR

FIELD OF THE INVENTION

The invention relates generally to batteries, and more particularly to high performance batteries.

BACKGROUND OF THE INVENTION

A typical battery includes one or more electrochemical cells which are electrically connected within the battery and provide the source of electrical power for the battery. These cells generally comprise four basic components: a positive electrode (anode on charge and cathode on discharge) that receives electrons from an external circuit as the cell is discharged; a negative electrode (cathode on charge and anode on discharge) that donates electrons to the external circuit as the cell is discharged; an electrolyte (often in a solution or paste) which provides a mechanism for electrical charge to flow between the positive and negative electrodes; and one or more separators which electrically isolate the positive and negative electrodes. This configuration enables the cell to generate electric power because of the electrochemical relationship of these components. Once the current is generated, it is typically carried from the positive electrode through a current carrier to a terminal, from where it is conveyed to the external circuit and back into the battery through a terminal connected with the negative electrode plate (typically through another current carrier).

With any battery, performance can be defined by certain parameters. These can include, inter alia, the voltage, current, and capacity of the battery. Obviously, the battery for a particular application should be designed with these parameters in mind.

One set of performance parameters that can present difficulty in achieving are those of a rechargeable high performance battery, such as that used for powering "hybrid" electric vehicles (i.e., vehicles that rely on both a battery-driven motor and an internal combustion engine for motive power), power tools and electric vehicles. Such batteries typically have low resistance so that current can be generated and provided to an external device very rapidly. Also, it is typically desirable that such a battery, particularly when used in conjunction with a hybrid vehicle, have a relatively low weight, and that it accept charge easily and rapidly.

In the cells of a high performance battery, the electrode plates, the electrolyte, and the separators should be selected such that the electrochemical relationship between these components can provide the desired current level in an acceptable discharge duration; of course, it would be desirable if such a battery were able to utilize currently available materials. Also, the cells should provide a current flow path from the electrode plates to and out of the cell terminal with relatively low resistance. Further, it would be desirable for the cells to have a configuration that facilitates manufacturing thereof.

SUMMARY OF THE INVENTION

The invention is directed to a low capacity, low resistance, high power cell. As a first aspect, the invention is directed to a winding assembly for a battery. The winding assembly includes a positive electrode plate, a negative electrode plate, a separator sheet, and a current collector. The positive and negative plates and the separator sheet are wound in overlying relationship such that the separator sheet is positioned between the positive and negative plates, an exposed top edge of the positive electrode plate is spaced longitudinally from an adjacent unexposed top edge of the negative plate, and an exposed bottom edge of the negative electrode plate is spaced longitudinally from an unexposed bottom edge of said positive electrode plate. The current collector is connected to one of the exposed edges of one of the positive and negative electrode plates, and, accordingly, is spaced apart from the adjacent unexposed bottom edge of the other (i.e., the non-attached) electrode plate. The current collector includes a terminal mounting portion and a radially extending collecting web. The collecting web of the current collector includes a perimeter, at least one open-ended perimeter aperture located at the perimeter and extending radially inwardly therefrom, and at least one closed-end internal aperture positioned between the terminal portion and the perimeter. In this configuration, the current collector can facilitate current flow from the electrode plate to which it is attached through a terminal and into an external circuit, thus providing a cell with the ability to deliver high current quickly. Also, this configuration can simplify attachment of the current collector to an adjacent electrode plate by providing access for an attachment tool (such as a welding device) at both internal and perimeter locations on the current collector.

The winding assembly is particularly suitable for use with positive and negative electrode plates and current collectors formed of lead-containing materials. In one embodiment, the current collector includes multiple perimeter apertures, multiple internal apertures, or both (either or both of which can be spaced circumferentially equidistant from each other). Preferably, current collectors of the described configuration are attached at both ends of the winding assembly. Also, it is preferred that the winding be placed in a container and terminals added to the current collectors to form a cell for a battery.

As a second aspect, the invention is directed to a winding assembly for a cell which includes positive and negative electrode plates and a separator circumferentially wound as described above, as well as current collectors attached to the top edge of the positive electrode plate and to the bottom edge of the negative electrode plate. At least one of the current collectors is formed of a third material and includes a terminal mounting portion and a radially extending collecting web. The collecting web includes a collecting portion, at least one recessed area within the collecting portion, and an aperture positioned within the recessed area. In this configuration, the application of heat of a preselected temperature and duration can cause the recessed area and electrode plate edge to melt into a joint (due to similarity in thermal mass), while the collecting portion remains substantially unchanged in shape. As a result, attachment of the current collector to the adjacent electrode plate is facilitated.

As with the first aspect of the invention, the above-described winding assembly is particularly suitable for use with positive and negative electrode plates and current collectors formed of lead-containing materials. In one embodiment, the current collector includes multiple perimeter apertures, multiple internal apertures or both (either or both of which can be spaced circumferentially equidistant from each other). Preferably, current collectors of the described configuration are attached at both ends of the winding assembly. Also, it is preferred that the winding be placed in a container and terminals added to the current collectors to form a cell for a battery.

As a third aspect, the invention is directed to a cover assembly for a battery cell. The cover assembly includes an internal cover including a vent and an external cover attached to the internal cover in overlying relationship. The external cover includes a downwardly-extending rib positioned directly above the vent. The cover assembly further includes a flexible diaphragm positioned in the vent that includes a projection extending upwardly to contact the rib of the external cover. In this configuration, the interaction between the rib and the projection maintains the diaphragm in place in the vent so that electrolyte does not leak from the cavity of the cell, yet allows venting of the battery cavity should the pressure therein become excessive.

DETAILED DESCRIPTION OF THE INVENTION

Embodiments of the invention now will be described fully with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numerals refer to like components throughout. The dimensions of some components may be exaggerated for clarity.

Figure 1:
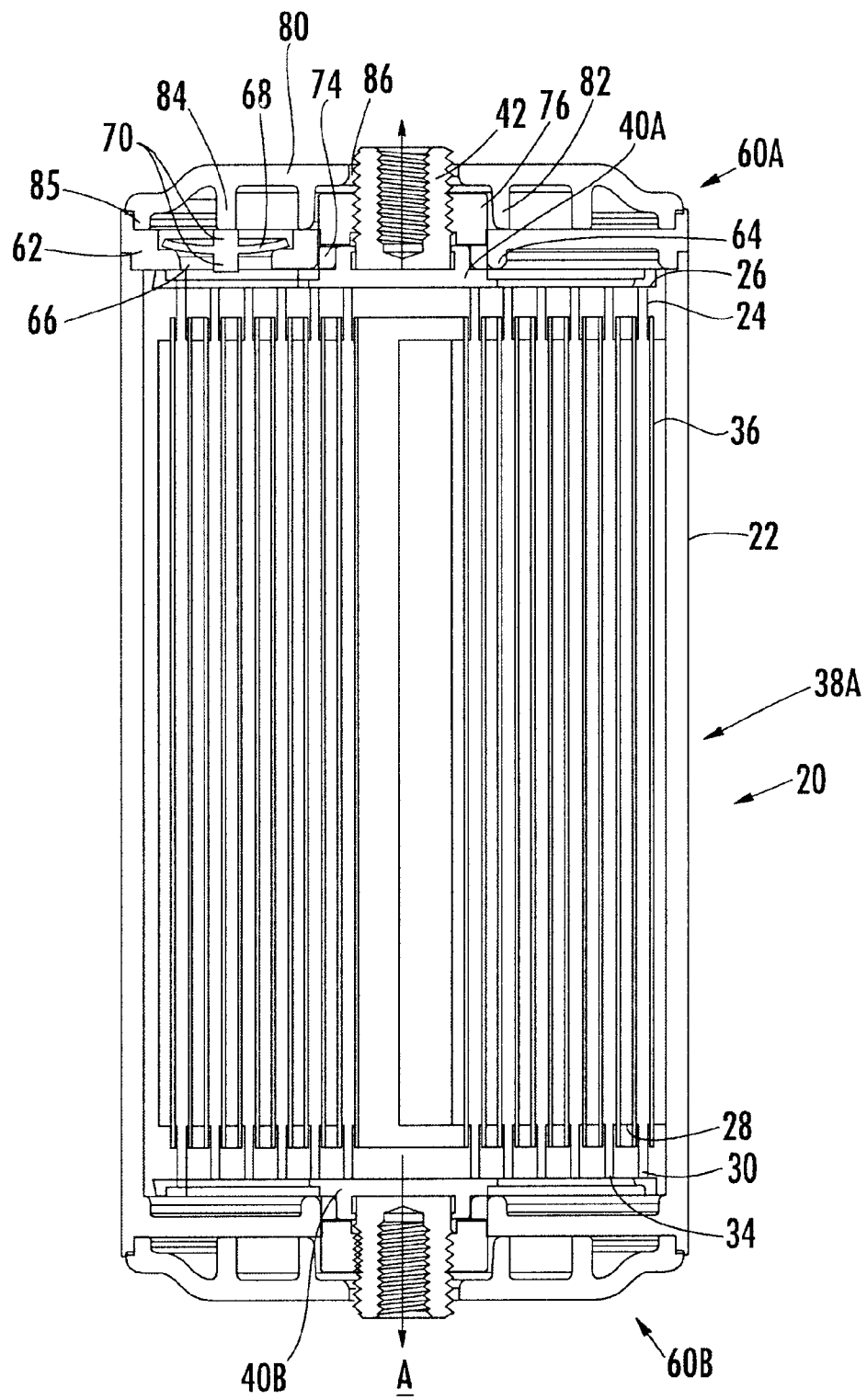
FIG. 1 is a front section view of a cell of the invention.

Referring now to the figures, a cell, designated broadly at 20, is illustrated in FIG. 1. The cell 20 includes a cylindrical outer can 22, positive and negative electrode plates 24, 30 spirally wound with a separator sheet 36 into a winding 38 (see FIG. 3), top and bottom current collectors 40A, 40B (which together with the winding 38 form a winding assembly 38A), and top and bottom cover assemblies 60A, 60B. These components are described in greater detail below.

The can 22 is, illustratively and preferably, cylindrical and is formed of an electrically insulative material, such as a polymeric material (examples include polycarbonate, acrylonitrile-butadiene-styrene, and blends and co-polymers thereof) or a polymer-lined metal (examples include aluminum and painted mild steel). Rather than being cylindrical, the can 22 can alternatively take other shapes, including those in which its cross-section is oval, elliptical, or some other non-circular shape, such as the shapes described in Applicant's co-pending application Ser. No. 09/368,769 (the '769 application), the disclosure of which is hereby incorporated herein by reference in its entirety. Irrespective of its shape, the can 22 or alternative container should be sized such that, when the winding 38 is positioned therein, the positive electrode 24, negative electrode 30 and separator 36 are compressed, as such compression can increase contact between these components and thereby improve battery performance.

Figure 3:
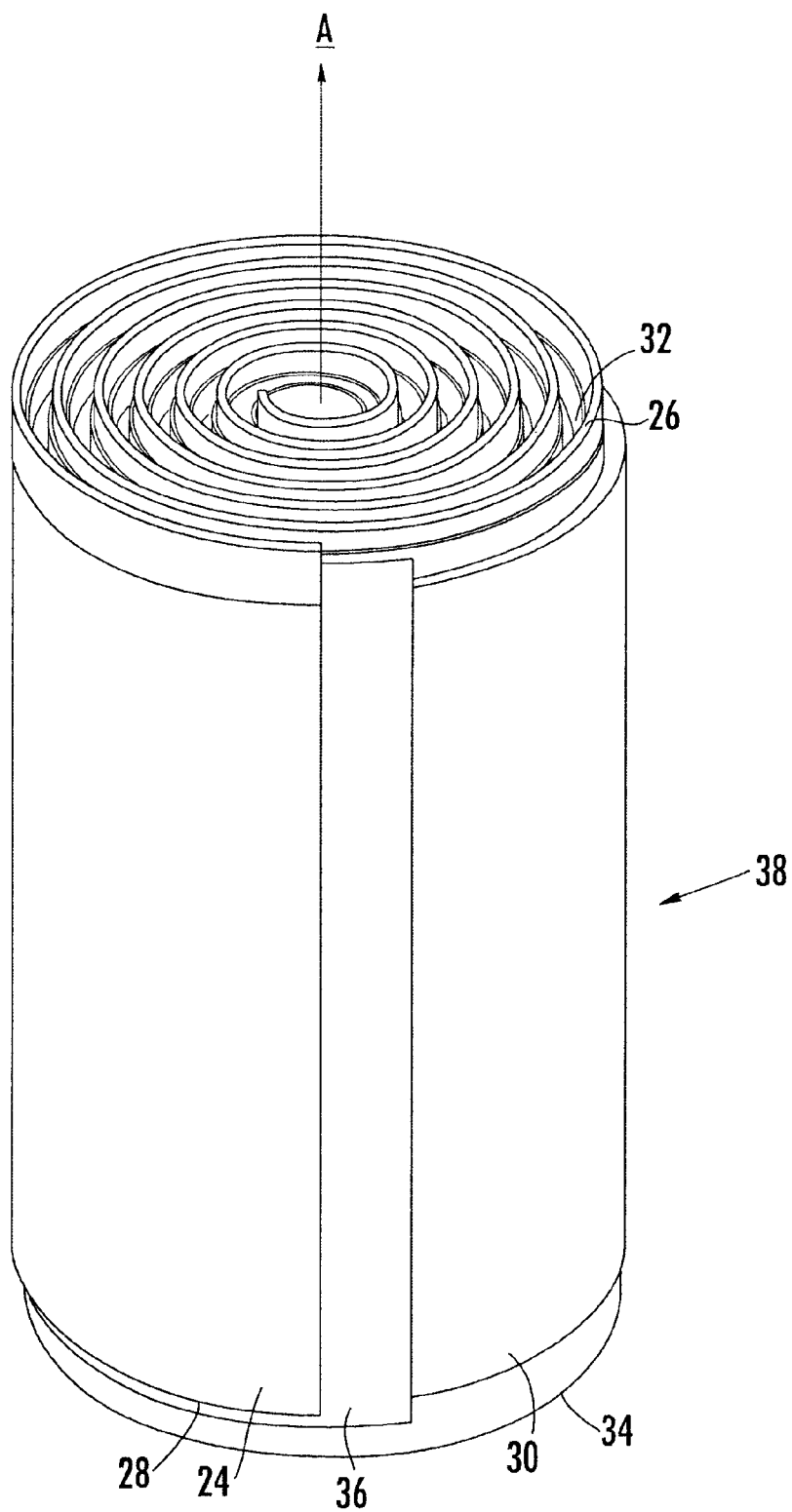
FIG. 3 is an enlarged perspective view of the positive and negative electrode plates and the separator sheet of the cell of FIG. 1.

Turning now to FIG. 3, in which the winding 38 is illustrated in isolation, the positive electrode 24 and negative electrode 30 are thin layers disposed in a circumferentially wound configuration about an axis A in which they are separated from direct contact with one another by the separator 36. As used herein, the term "circumferentially wound" in reference to one or more layers means that the layer defines a path about a central axis in which, for a given angle relative to an imaginary baseline that extends normal to the axis, subsequent layers increase in distance from the axis. The term is intended to include non-circular spiral paths, such as those in which the path formed by a layer is generally elliptical, oblong or oval in shape, as well as spiral paths in which a circumferentially wound circular, elliptical or oval shape is flattened somewhat, such as by the application of pressure from opposite sides. Such shapes are described in the '769 application referenced above.

The materials for the positive electrode 24 and negative electrode 30 should be selected such that they have the capacity to exhibit the desired electrochemical relationship for the generation of electric power. Similarly, the material for the separator 36 should be selected to enhance this electrochemical relationship. Also, the materials for positive and negative electrodes 24, 30 and the separator 36 should have sufficient flexibility and toughness to be successfully circumferentially wound and further processed into the desired shape. Exemplary materials for the positive electrode 24 include lead-containing materials, such as lead oxides and lead sulphates. As used herein, "lead-containing material" means that the material contains at least 50 percent lead by weight; preferred lead-containing materials include at least 68 percent lead by weight. Exemplary materials for the negative electrode 30 include lead-containing materials such as lead oxide and lead sulphates. Exemplary materials for the separator 36 include glass microfibers and organic particularly polymeric materials. In one embodiment, the positive and negative electrodes are lead-containing materials, and the separator is a polymeric sheet reinforced with glass or other microfibers. These materials are discussed in detail in the '769 application.

Referring still to FIG. 3, the positive electrode 24 and negative electrode 30 are circumferentially wound such that the top edge 26 of the positive electrode 24 is longitudinally spaced along the axis A from the top edge 32 of the negative electrode plate 30. Preferably, this spacing is between about 0.1 and 0.2 inches, with a spacing of 0.125 inches being more preferred. Similarly, the bottom edge 34 of the negative electrode plate 30 is longitudinally spaced along the axis A from the bottom edge 28 of the positive electrode 24, with a similar spacing as described above for the top edges 26, 32 being preferred. In this configuration, the top edge 26 of the positive electrode 24 is available for electrical contact with the current collector 40A without the negative electrode 30 being in electrical contact therewith; similarly, the negative electrode 30 can be in electrical contact with the current collector 40B without the current collector 40B being in electrical contact with the positive electrode 24. Such a configuration is described in U.S. Pat. Nos. 5,047,300; 5,045,086; and 5,368,961 to Juergens and U.S. Pat. No. 5,677,078 to Juergens et al., the disclosures of each of which are hereby incorporated herein by reference in their entireties.

Figure 4:
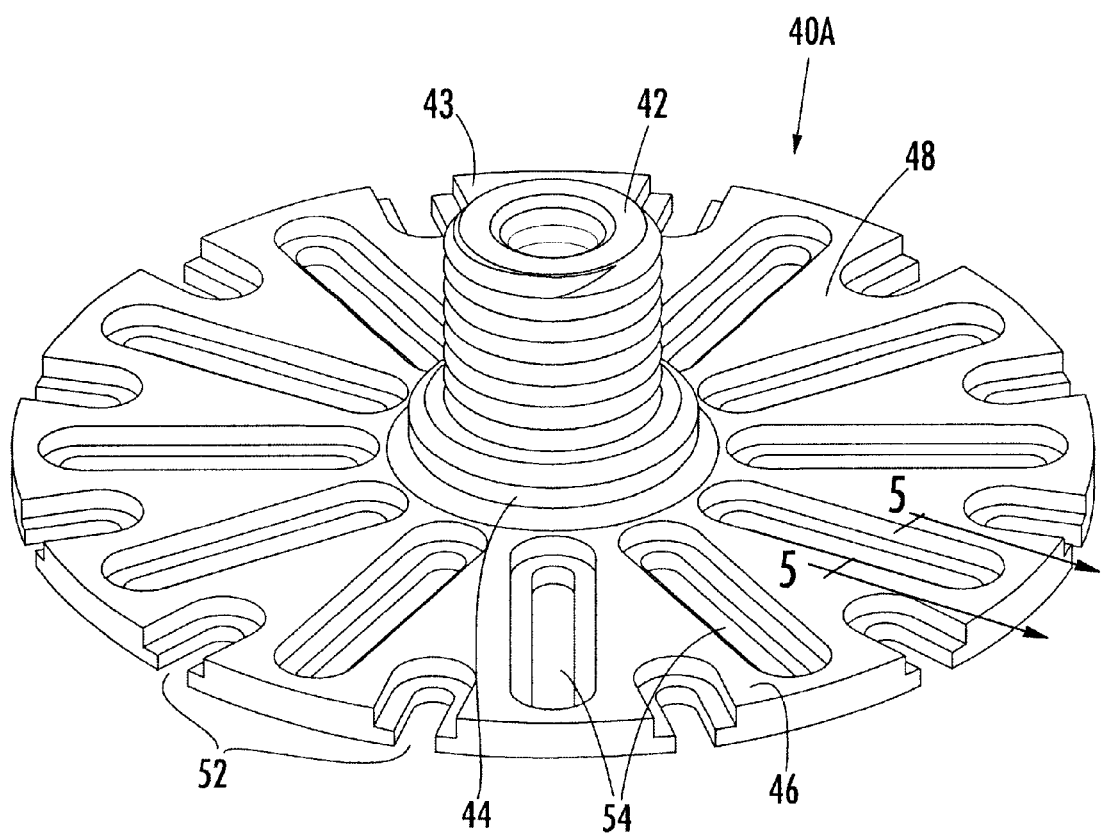
FIG. 4 is a greatly enlarged perspective view of the current collector and terminal of the cell of FIG. 1.

Referring now to FIG. 4, the current collector 40A of the described embodiment has an essentially identical configuration to that of the current collector 40B (with the current collector 40B being oriented "upside-down" relative to the current collector 40A); as such, only the current collector 40A will be described herein, with the understanding that the discussion thereof is equally applicable to the current collector 40B.

The current collector 40A includes a cylindrical terminal 42 and a collecting web 43 that includes a terminal mounting portion 44 and a collecting portion 46. The lower end of the terminal 42 is embedded in the terminal mounting portion 44, and the remainder of the terminal 42 extends upwardly therefrom. In this configuration, the terminal 42 and the collecting web 43 can be manufactured as a single unitary component by lowering the terminal 42 into the terminal mounting portion 44 during the molding of the collecting web 43. Alternatively, the terminal 42 may be mounted in the terminal mounting portion 44 in other ways, such as being welded or soldered thereon. Illustratively, the terminal 42 includes both external and internal threads to facilitate the attachment of other components.

Preferably, the terminal 42 is formed of a high conductivity material, such as pure copper, brass or some other copper-containing alloy, and has a relatively high cross-sectional area to reduce resistance to electric current. For example, if the cell 20 is designed to deliver 200 amps of current, it is preferred that the terminal 42 have a cross-sectional area of at least about 0.08 in$^2$.

Referring still to FIG. 4, the terminal mounting portion 44 is generally centrally located in the collecting web 43. The terminal mounting portion 44 is somewhat thicker than the collecting portion 46 to enable the lower end of the terminal 42 to be embedded therein and to reduce electrical resistance.

The collecting portion 46 is illustratively generally circular, although the collecting portion 46 may take the ovoid, elliptical, and other shapes described in the '769 application to match the shape of the winding 38. The collecting portion 46 merges at its interior with the terminal mounting portion 44 and includes a generally flat upper surface 48 and a generally flat lower surface 50 (see FIG. 5), portions of which are attached to the top edge 26 of the positive electrode 24.

Open-ended perimeter slots 52 extend radially inwardly from the perimeter of the collecting portion 46. Illustratively and preferably, these are spaced circumferentially equally about the perimeter of the collecting portion 46. In addition, radially extending closed-ended internal slots 54 are included in the collecting portion 46; these are also circumferentially equally spaced about the collecting portion 46 and, illustratively and preferably, are arranged in a circumferentially alternating pattern such that one internal slot 54 resides between each pair of adjacent perimeter slots 52 and vice versa.

The perimeter and internal slots 52, 54 are included in the collecting portion 46 to provide direct access for a welding tool or some other joining device designed to interconnect the collecting portion 46 with the positive electrode top edge 26 at locations where the collecting portion 46 and top edge 26 meet. Preferably, the slots 52, 54 are between about 0.04 and 0.19 inches in width, but may be sized differently for different welding tools.

Of course, those skilled in this art will appreciate that other aperture patterns may also be employed in current collectors with the invention. For example, the slots 52, 54 as illustrated are substantially uniform in width; however, alternative configurations may include apertures of non-uniform width, such as apertures that flare or taper outwardly with increasing distance from the terminal mounting portion 44. Also, all of the slots may be open-ended perimeter slots, or all of the slots may be closed-end internal slots as desired. The aperture pattern of the collecting portion 46 should permit the attachment of multiple points on the positive electrode top edge 26 to the collecting portion 46 and, preferably, should allow current to take a relatively direct path from the top edge 26 of the positive electrode 24 to the terminal mounting portion 44.

The collecting web 43 can be formed as a contiguous unit from a high-conductivity material that is compatible for attachment to the top edge 26 of the positive electrode 24 and that can convey current from the positive electrode top edge 26 to the terminal 42. For example, if the positive electrode 24 is formed of a lead-containing material, preferably the collecting web 43 is also formed of a lead-containing material, such as "pure" lead (i.e., a material that includes at least 99 percent lead).

Figure 5:
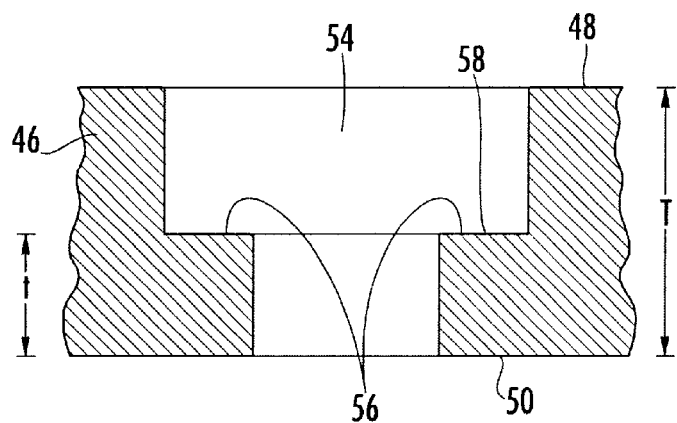
FIG. 5 is a section view of the current collector taken along lines 5—5 of FIG. 4.

Referring still to FIG. 4 and referring also to FIG. 5, each of the perimeter slots 52 and internal slots 54 is surrounded by a recessed area 56 (an exemplary internal slot 54 and its accompanying recessed area 56 are illustrated in FIG. 5). The recessed area 56 is defined by an upper surface 58 that is below and substantially parallel with the upper surface 48 of the collecting portion 46. The thickness t of the recessed area 56 (i.e., measured between the upper surface 58 of the recessed area 56 and the lower surface 50 of the collecting portion 46) is selected such that the recessed area 56 has a substantially similar thermal mass to that of the top edge 26 of the positive electrode 24. As such, when heat of a pre-selected temperature and duration is applied to the recessed area 56 and the top edge 26 of the positive electrode 24, these areas will soften (and perhaps melt) and weld together to form a joint. However, the thickness T of the remainder of the collecting portion 46 (ie., measured between the upper surface 48 and the lower surface 50 of the collecting portion 46) is sufficient that its thermal mass enables it to resist melting during the application of heat sufficient to melt the recessed area 56 and top edge 26. Thus, the collecting portion 46 becomes affixed to the positive electrode 24 without significant deformation of the non-recessed areas of the collecting portion 46.

As an example, for a positive electrode 24 formed of a lead-containing material having a thickness of 1 mm and a collecting portion 46 formed of pure lead having a recessed area 56 with a thickness t of 0.8 mm, the remainder of the collecting portion 46 can have a thickness T of at least 1.5 mm and not experience a significant change in shape when heat is applied to the recessed area 56 and to the top edge 26 of the positive electrode 24 in the form of a welding torch at 621° F. for a duration of a few milliseconds. As a result, the positive electrode 24 can be attached to the recessed area 56 without adversely affecting the shape (and, in turn, the performance) of the non-recessed area of the collecting portion 46. Of course, other combinations of the thicknesses t and T of the collecting portion 46 and the thickness of the positive electrode 24 and the temperature and duration of applied may also be suitable for use with the invention.

As noted above in the illustrated embodiment, the current collector 40B has an identical configuration to that of the current collector 40A. As such, the foregoing discussion regarding the current collector 40A is equally applicable to the current collector 40B with the exception that the lower surface of the current collector 40B is joined to the bottom edge 32 of the negative electrode 30, with the result that the terminal 42 of the current collector 40B extends downwardly. The current collectors may also take alternative configurations, such as one that lacks recesses (around the perimeter and internal slots or one having only internal slots.

As other exemplary alternatives, the collector may lack a terminal mounting portion that does not vary in thickness from the collecting portion, or the collecting portion may be tapered such that it increases in thickness from perimeter to center.

Figure 2:
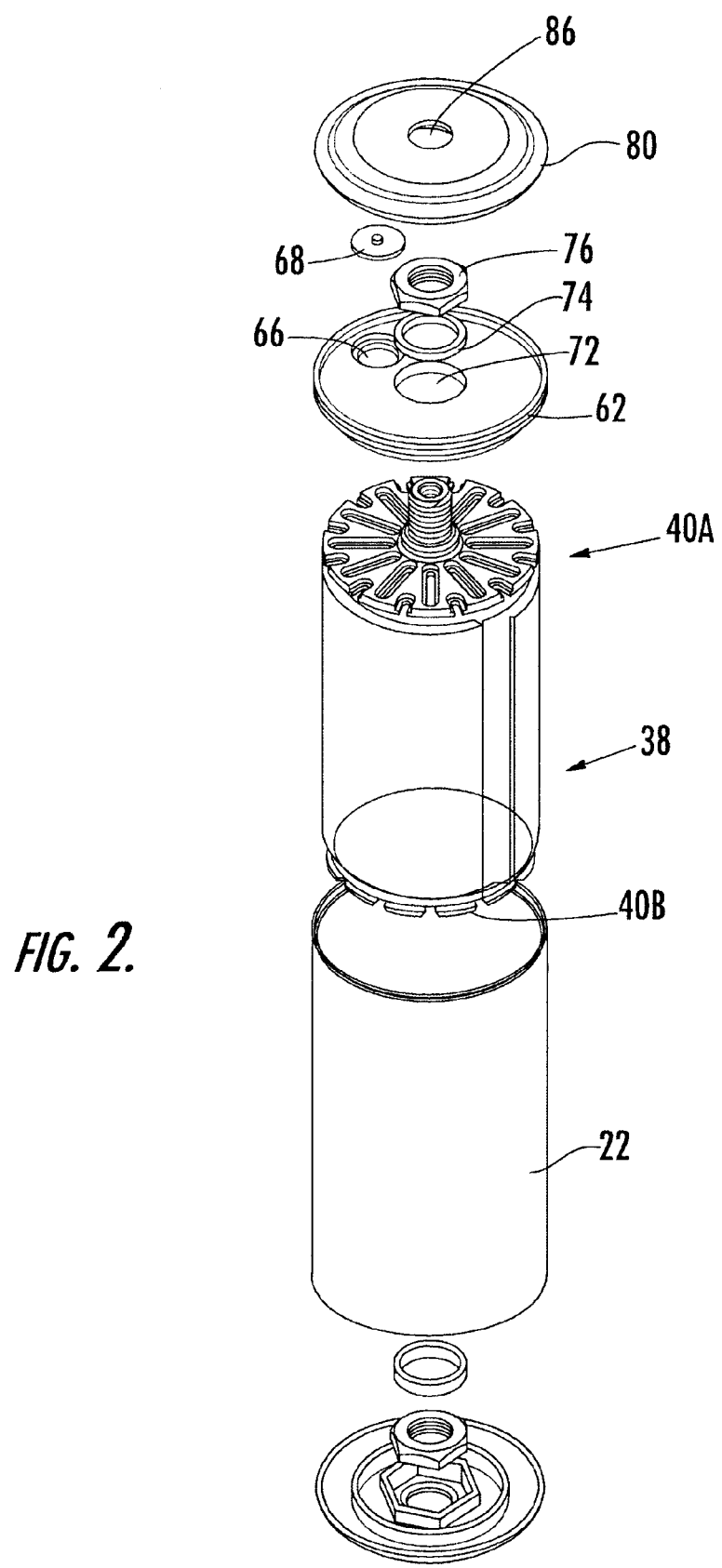
FIG. 2 is an exploded perspective view of the cell of FIG. 1.

Referring back to FIGS. 1 and 2, the ends of the cell 20 are sealed by the top and bottom cover assemblies, 60A, 60B. The cover assemblies 60A, 60B are quite similar in configuration, so only the top cover assembly 60A will be described herein, with the differences in the bottom cover assembly 60B being noted.

The top cover assembly 60A includes an internal cover 62 which is illustratively generally circular, although the shape of the internal cover 62 can also take other configurations; it preferably matches the shape of the winding 38 and current collector 40. The internal cover 62 includes a circular central rib 64 on its lower surface that extends downwardly to contact the upper surface 48 of the current collector 40A. A central aperture 72 receives and encircles the terminal mounting portion 44 of the current collector 40A and the terminal 42.

The internal cover 62 is typically formed of a polymeric material or a polymer-lined metal. It is preferably formed of a material that can be easily attached to the top edge of the can 22 (such as with heat or ultrasonic welding or adhesive bonding).

Figure 6:
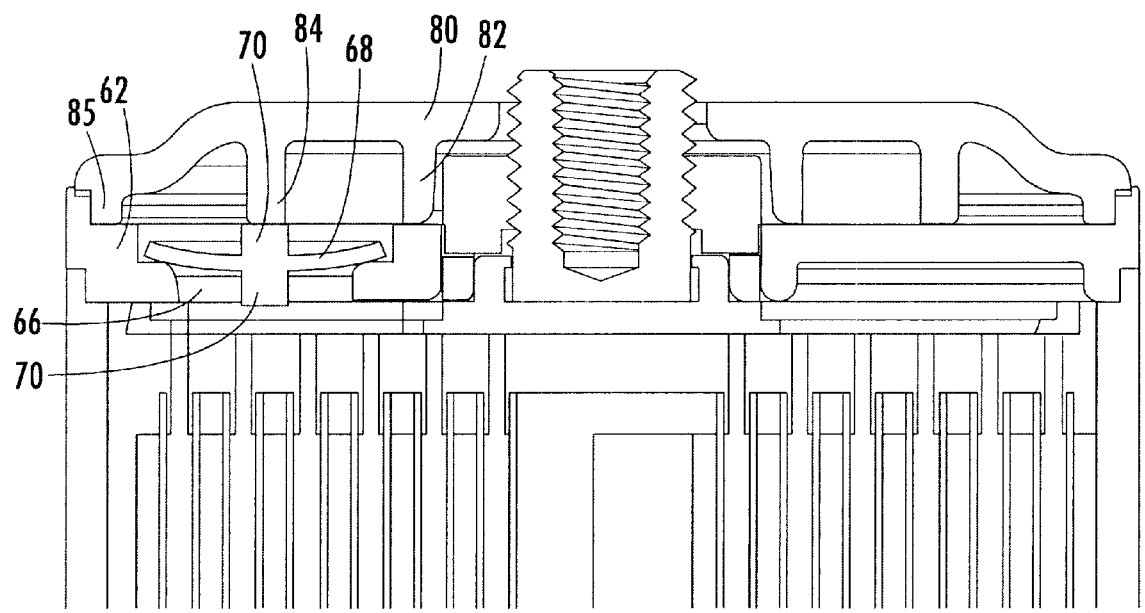
FIG. 6 is an enlarged section view of the top cover assembly including the diaphragm.

A circular vent 66 (seen best in FIG. 6) is eccentrically positioned on the internal cover 62 such that it resides above a small area of the collecting portion 46 of the current collector 40A. A flexible diaphragm 68 having upwardly and downwardly extending posts 70 covers the vent 66 and can provide a gastight seal between the cavity of the cell 20 and the external environment. This seal retains electrolyte contained in the cell; however, in the event that the cell 20 generates substantial internal pressure (such as when the cell is in a high state of overcharge, which can cause inefficient oxygen recombination; the uncombined oxygen can cause the pressure inside the cell to rise significantly), the edges of the diaphragm 68 can flex upwardly away from the vent 66, thereby allowing the internal pressure to be relieved. Exemplary materials for the diaphragm include EPDM and neoprene rubber.

An annular gasket 74 encircles the terminal mounting portion 44 of the current collector 40A and fits within the central rib 64 of the internal cover 62. Like the diaphragm 68, the gasket 74 seals the terminal 42 and the external environment from the electrolyte present within the cell 20. A nut 76 is threaded onto the external threads of the terminal 42 and compresses the gasket 74 against the radially inward section of the collecting web 43 to provide a gas-tight seal at that location. The gasket is typically formed of EPDM rubber.

The top cover assembly 60A also includes an external cover 80 that rests atop the internal cover 62 and is welded or otherwise attached to the perimeter thereof. The external cover 80 includes a downwardly-extending, hexagonally-shaped central rib 82 within which the hexagonal nut 76 resides; the central rib 82 prevents the nut 76 from loosening once tightened. Also, the external cover 80 includes a downwardly-extending, circular intermediate rib 84 that is positioned to apply a downward force to the upwardly extending post 70 of the diaphragm 68 when the external cover 80 is in place. In this configuration, the intermediate rib 84 is able to maintain the diaphragm 68 in position to provide an external seal that prevents electrolyte leakage. An outer rib 85 extends downwardly from the perimeter portion of the external cover 80 to facilitate attachment of the external cover 80 to the internal cover 62. The external cover 80 also includes an aperture 86 that receives the terminal 42, which then extends above the external cover 80 to provide a contact component for a post or other connection component.

The external cover 80 is typically formed of a polymeric material or a polymer-lined metal. The material of the external cover 80 is preferably one that facilitates attachment of the external to the internal cover 62. For example, if the internal cover 62 is formed of a polymeric material, and the internal and external covers 80 are to be joined by welding, the external cover 80 should also be formed of the same polymeric material or one that has physical properties that render it compatible with welding to the material of the internal cover 62.

The bottom cover assembly 60B includes an external cover 80 and gasket 74 that are identical to the external cover 80 and gasket 74 of the top cover assembly 60A. The internal cover 62 associated with the bottom cover assembly lacks a vent 66; thus, the diaphragm 68 is also omitted, although an identical internal cover 62 may also be employed. The materials described above for the internal and external covers 62, 80 and the diaphragm 68 of the top cover assembly 60A should also be suitable for the bottom cover assembly 60B.

The cell 20 is assembled by first circumferentially winding the positive and negative electrodes 24, 30 and the separator 36 into the winding 38 such that the top and bottom edges of the positive and negative electrodes 24, 30 are longitudinally spaced as described above. The top current collector 40A is positioned in contact with the top edge 26 of the positive electrode 24 and is welded thereto by inserting a welding tool into the individual perimeter and internal slots 52, 54. During welding, the recessed areas 56 of the slots 52, 54 tend to melt, as do areas of the top edge 26 of the positive electrode 24, because their thermal masses are similar, but the remainder of the collecting portion 46 retains its shape. It is preferred to form welds between the top edge 26 and the collecting portion 46 over as much surface area as possible in order to facilitate current passage. Once the current collector 40A has been attached, the procedure is repeated for the attachment of the current collector 40B to the bottom edge 32 of the negative electrode 30 to complete the formation of the winding assembly 38A. The winding assembly 38A is then inserted into the can 22. The gaskets 74 are slipped over the terminal mounting portions 44 of the current collectors 40A, 40B, and the nuts 76 are threaded onto the external threads of the terminals 42. The internal covers 62 are then ultrasonically welded or otherwise attached to the upper and lower perimeters of the can 22. Electrolyte solution is added to the positive and negative electrodes 24, 30 through the vent 66. The diaphragm 68 is positioned over the vent 66, and the external covers 80 are ultrasonically welded to the internal covers 62, with the central rib 82 of each cover fitting over the nut 76 and the medial rib 84 of the top external cover 80 pressing downwardly on the post 70 of the diaphragm 68 to maintain it in position. A terminal connector can then be threaded into the internal threads of the terminal 42 to provide a connection point for an external circuit.

Once completed, the cell 20 is configured to convey current efficiently from the winding 38 to the current collectors 40A, 40B, to the terminal 42 and out of the cell 20. The configuration of the current collectors 40A, 40B enables them to be attached expeditiously to many points along the edges of the electrodes 24, 30 through the access provided by the slots 52, 54 without substantial change in shape to the collecting portion 46. The configuration of the slots 52, 54 enables current to travel in a direct, low resistance path to the terminal 42. The terminal 42 itself, with proper sizing and material selection, can serve to enhance current flow. As such, the present configuration can enable the cell to provide desirable current flow properties to batteries, particularly those to be used in high performance applications like hybrid vehicles, electric vehicles, and portable power tools, although those skilled in this art will recognize that the cell 20 may be suitable for use in many other applications also.

Notably, the cover assemblies 60A, 60B also facilitate manufacturing of the cell 20, as they enable the manufacturer to attach a cover that includes a vent to the can 22, and to do so rapidly. The presence of the intermediate rib 84 and the post 70 allows the diaphragm 68 to remain in position without further retaining structure, and the configurations of the internal and external covers 62, 80 enable them to be attached quickly to one another and to the can 22.

Figure 7:
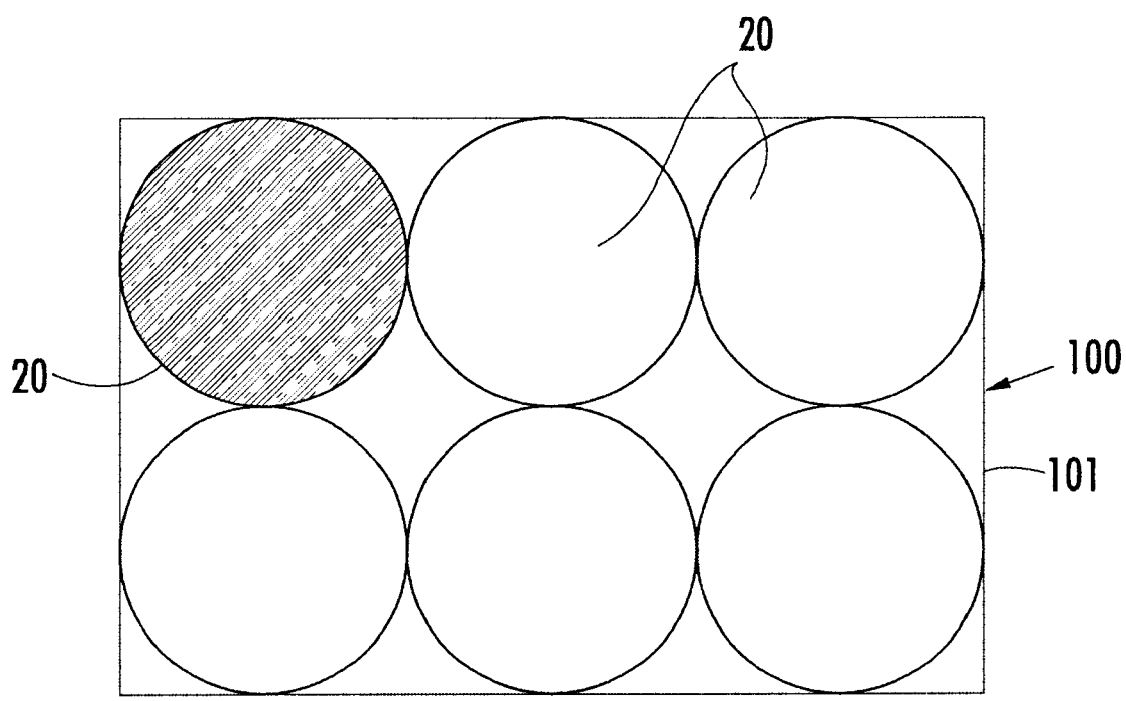
FIG. 7 is a top view of a battery containing multiple cells of the invention.

Those skilled in this art will recognize that the cell of the invention can be used either by itself or on conjunction with a plurality of cells to form a multicell battery (as is shown at 100 in FIG. 7, which includes six interconnection cells 20). If a plurality of cells is to be used, the terminals of the cells are typically electrically connected via wires, metal straps, or the like. The interconnected cells can then be placed in a single housing 101.

The foregoing is illustrative of the invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A winding assembly for a battery, comprising:
   a positive electrode plate;
   a negative electrode plate;
   a separator sheet;
   said positive and negative plates and said separator sheet being wound in overlying relationship such that said separator sheet is positioned between said positive and negative plates, and such that an exposed top edge of said positive electrode plate is spaced longitudinally from an unexposed top edge of said negative plate, and such that an exposed bottom edge of said negative plate is spaced longitudinally from an unexposed bottom edge of said positive plate; and
   a first current collector connected to said top edge of said positive electrode plate and being spaced apart from said top edge of said negative electrode plate;
   a second current collector connected to said bottom edge of said negative electrode plate and being spaced apart from said bottom edge of said positive electrode plate;
   at least one of said first and second current collectors comprising a terminal mounting portion and a radially extending collecting web, said collecting web including a collecting portion, at least one recessed area, and an aperture positioned within said recessed area, the collecting portion having flat upper and lower surfaces that are substantially parallel with each other, said lower surface contacting one of said positive electrode plate and said negative electrode plate.

2. The winding assembly defined in claim 1, wherein said positive electrode plate has a first thickness and is formed of a first material, said negative electrode plate has a second thickness and is formed of a second material, said collecting web is formed of a third material and has a third thickness, said recessed area has a fourth thickness, and said first, second, third and fourth thicknesses and said first, second and third materials are selected such that said recessed area and said electrode plate top edge adjacent thereto melt upon application thereto of heat of a preselected temperature and duration, and said collecting portion does not melt upon the application of heat of said preselected temperature and duration.

3. The winding assembly defined in claim 1, wherein said collecting portion has a perimeter that is substantially circular.

4. The winding assembly defined in claim 1, wherein said recessed area includes an upper surface, and said recessed area upper surface and said collector portion lower surface are substantially parallel.

5. The winding assembly defined in claim 1, wherein said at least one aperture is at least one radially-extending slot.

6. The winding assembly defined in claim 5, wherein said at least one recessed area is a plurality of recessed areas, and said at least one slot is a plurality of radially-extending slots, each of said slots being positioned in a respective one of said recessed areas.

7. The winding assembly defined in claim 6, wherein at least one of said plurality of slots has an open end located at the perimeter of said collecting portion.

8. The winding assembly defined in claim 6, wherein at least one of said plurality of slots has closed ends and is positioned between said terminal portion and the perimeter of said collecting portion.

9. The winding assembly defined in claim 1, further comprising a terminal extending upwardly from said terminal mounting portion.

10. The winding assembly defined in claim 9, wherein said terminal is formed of brass.

11. A cell for a battery, comprising:
   a hollow container;
   a winding assembly positioned within said container, said winding assembly comprising:
      a positive electrode plate;
      a negative electrode plate;
      a separator sheet;
      said positive and negative plates and said separator sheet being circumferentially wound in overlying relationship such that said separator sheet is positioned between said positive and negative electrode plates, an exposed top edge of said positive electrode plate is spaced longitudinally from a adjacent unexposed top edge of said negative electrode plate, and an exposed bottom edge of said positive electrode plate is spaced longitudinally from an adjacent unexposed bottom edge of said negative electrode plate;
      a first current collector connected to said top edge of said positive electrode plate and being spaced apart from said top edge of said negative electrode plate, said first current collector comprising a generally centrally located terminal mounting portion and a radially extending collecting web;
      a second current collector connected to said bottom edge of said negative electrode plate and being spaced apart from said bottom edge of said positive electrode plate, said second current collector comprising a centrally located terminal mounting portion and a radially extending collecting web;

said collecting web of at least one of said first and second current collectors and having a collecting portion, at least one recessed area, and an aperture positioned within said recessed area, the collecting portion having flat upper and lower surfaces that are substantially parallel with each other, said lower surface contacting one of said positive electrode plate and said negative electrode plate; and first and second terminals mounted in, respectively, said terminal mounting portions of said first and second current collectors.

12. The cell defined in claim 11, wherein said positive electrode plate has a first thickness and is formed of a first material, said negative electrode plate has a second thickness and is formed of a second material, said collecting portion is formed of a third material and has a third thickness, said recessed area has a fourth thickness, and said first, second, third and fourth thicknesses and said first, second and third materials are selected such that said recessed area and said electrode plate top edge adjacent thereto melt upon application thereto of heat of a preselected temperature and duration, and said collecting portion does not melt upon the application of heat of said preselected temperature and duration.

13. The cell defined in claim 11, further comprising top and bottom cover assemblies attached to top and bottom portions of said container, each of said top and bottom cover assemblies including an internal cover and an external cover adjacent said internal cover, wherein each internal cover is positioned adjacent a respective one of said first and second current collectors.

14. The cell defined in claim 13, wherein one of said internal covers includes a venting aperture.

15. The cell defined in claim 14, further comprising a diaphragm valve within said venting aperture, wherein said diaphragm valve includes a projection extending toward said external cover, and wherein said adjacent external cover includes a rib that extends toward said internal cover and contacts said projection.

16. A current collector for a winding assembly of a battery, said current collector comprising:

a terminal mounting portion; and a collecting web connected to said terminal mounting portion, said collecting web having a collecting portion and including a plurality of recessed areas within said collecting portion and a plurality of radially-extending slots positioned within said recessed areas, and wherein at least one of the plurality of slots has closed ends and is positioned between said terminal portion and a perimeter of said collecting portion.

17. The current collector defined in claim 16, further comprising a terminal mounted in and extending upwardly from said terminal mounting portion.

18. The current collector defined in claim 17, wherein said terminal is formed of a copper-containing material.

19. The current collector defined in claim 16, wherein said terminal mounting portion and said collecting web are integrally formed of a lead-containing material.

20. The current collector defined in claim 16, wherein at least one of said plurality of slots has an open end located at a perimeter of said collecting portion.

21. The current collector defined in claim 20, wherein said at least one slot having an open end comprises multiple slots having an open end spaced circumferentially equidistant from one another.

22. The current collector defined in claim 20, further comprising multiple apertures having closed ends spaced circumferentially equidistant from one another.

23. A winding assembly for a battery, comprising:

a positive electrode plate;

a negative electrode plate;

a separator sheet;

said positive and negative plates and said separator sheet being wound in overlying relationship such that said separator sheet is positioned between said positive and negative plates, and such that an exposed top edge of said positive electrode plate is spaced longitudinally from an unexposed top edge of said negative plate, and such that an exposed bottom edge of said negative plate is spaced longitudinally from an unexposed bottom edge of said positive plate; and a first current collector connected to said top edge of said positive electrode plate and being spaced apart from said top edge of said negative electrode plate;

a second current collector connected to said bottom edge of said negative electrode plate and being spaced apart from said bottom edge of said positive electrode plate;

at least one of said first and second current collectors comprising a terminal mounting portion and a radially extending collecting web, said collecting web including a collecting portion, at least one recessed area, and an aperture positioned within said recessed area;

wherein said positive electrode plate has a first thickness and is formed of a first material, said negative electrode plate has a second thickness and is formed of a second material, said collecting web is formed of a third material and has a third thickness, said recessed area has a fourth thickness, and said first, second, third and fourth thicknesses and said first, second and third materials are selected such that said recessed area and said electrode plate top edge adjacent thereto melt upon application thereto of heat of a preselected temperature and duration, and said collecting portion does not melt upon the application of heat of said preselected temperature and duration.

24. The winding assembly defined in claim 23, wherein said collecting portion has a perimeter that is substantially circular.

25. The winding assembly defined in claim 23, wherein said collecting portion includes a lower surface, said recessed area includes an upper surface, and said upper and lower surfaces are substantially parallel.

26. The winding assembly defined in claim 23, wherein said at least one aperture is at least one radially-extending slot.

27. The winding assembly defined in claim 26, wherein said at least one recessed area is a plurality of recessed areas, and said at least one slot is a plurality of radially-extending slots, each of said slots being positioned in a respective one of said recessed areas.

28. The winding assembly defined in claim 27, wherein at least one of said plurality of slots has an open end located at the perimeter of said collecting portion.

29. The winding assembly defined in claim 27, wherein at least one of said plurality of slots has closed ends and is positioned between said terminal portion and the perimeter of said collecting portion.

30. The winding assembly defined in claim 23, further comprising a terminal extending upwardly from said terminal mounting portion.

31. The winding assembly defined in claim 30, wherein said terminal is formed of brass.

32. A current collector for a winding assembly of a battery, said current collector comprising:
- a terminal mounting portion;
- a collecting web connected to said terminal mounting portion, said collecting web having a collecting portion and including at least one recessed area within said collecting portion and an aperture positioned within said recessed area; and
- a terminal mounted in and extending upwardly from said terminal mounting portion, the terminal being formed of a copper-containing material.

33. The current collector defined in claim 32, wherein said terminal mounting portion and said collecting web are integrally formed of a lead-containing material.

34. The current collector defined in claim 32, wherein said at least one aperture is at least one radially-extending slot.

35. The current collector defined in claim 34, wherein said at least one recessed area is a plurality of recessed areas, and said at least one slot is a plurality of radially-extending slots, each of said slots being positioned in a respective one of said recessed areas.

36. The current collector defined in claim 35, wherein at least one of said plurality of slots has an open end located at a perimeter of said collecting portion.

* * * * *